United States Patent [19]
Goldman et al.

[11] Patent Number: 5,905,944
[45] Date of Patent: May 18, 1999

[54] SECURE COMMUNICATION OF ACCESS INFORMATION

[75] Inventors: Shelly B. Goldman, East Brunswick; David Phillip Silverman, Somerville; Roy Philip Weber, Bridgewater, all of N.J.

[73] Assignee: AT&T Corp, Middletown, N.J.

[21] Appl. No.: 08/748,312

[22] Filed: Nov. 13, 1996

[51] Int. Cl.[6] .............................. H04Q 7/20; H04Q 7/24; H04Q 7/38
[52] U.S. Cl. ...................... 455/31.3; 455/410; 455/414
[58] Field of Search .................................. 455/403, 410, 455/411, 414, 31.2, 31.3

[56] References Cited

U.S. PATENT DOCUMENTS

| | | | |
|---|---|---|---|
| 5,119,412 | 6/1992 | Attallah | 379/102.07 |
| 5,257,307 | 10/1993 | Ise | 455/31.3 |
| 5,305,370 | 4/1994 | Kearns et al. | 379/45 |
| 5,311,570 | 5/1994 | Grimes et al. | 455/417 |
| 5,428,663 | 6/1995 | Grimes et al. | 455/31.2 |
| 5,457,737 | 10/1995 | Wen | 455/410 |
| 5,491,739 | 2/1996 | Wadin et al. | 455/31.2 |
| 5,502,761 | 3/1996 | Duncan et al. | 379/142 |
| 5,748,742 | 5/1998 | Tisdale et al. | 455/410 |
| 5,765,107 | 6/1998 | Korowajczuk | 455/410 |
| 5,771,446 | 6/1998 | Wilkinson | 455/410 |
| 5,774,804 | 6/1998 | Williams | 455/410 |

*Primary Examiner*—Willis R. Wolfe

[57] ABSTRACT

A system and method for secure communication of access information codes to access a telecommunications network and use network services, such as a personal reach service. In that regard, the present invention communicates the access information with the network over a secure paging channel. When call for the user is received at a personal reach service node, a paging message is transmitted to the user through a paging system, the paging message indicating that the call has been received. The user then places a call to the personal reach service node. Upon receiving the call from the user, a request for access information is transmitted to the user. The user then transmits a paging signal from a two-way pager, the paging signal including an indicator of the access information. The personal reach service node receives the indicator of the access information from the user through the paging system and validates the indicated access information. If the indicated access information is valid access is granted to the personal reach service and the two calls are connected to each other.

24 Claims, 4 Drawing Sheets

5,905,944

SECURE COMMUNICATION OF ACCESS INFORMATION

FIELD OF THE INVENTION

The present invention relates to a system and a method for secure communication of access information to access a telecommunications network service.

BACKGROUND OF THE INVENTION

Many telecommunications systems require that a person attempting to access the system be verified before access is granted. For example, user verification is required for accessing a personal reach service (PRS) that allows callers to reach service users at any location by dialing only one access telephone number. The personal reach service then automatically sends a message to the user's pager indicating that a caller is attempting to contact the user. If the caller has entered an optional personal identification number (PIN), the message sent to the user also includes that PIN number or the name of the caller. The user may then be connected to the caller by dialing an access number and by entering the user's PIN on the touch-tone keypad, for verifying the user. However, a problem arises when the user is using a cellular or other wireless telephone. The signal of a cellular phone may be intercepted and any information communicated by that signal may be obtained by unauthorized persons. Thus, unauthorized persons can obtain the user's PIN when it is entered on the touch-tone keypad. Consequently, a need arises for secure transmission of the PIN or other verification information to telecommunications services, such as a personal reach service.

SUMMARY OF THE INVENTION

The present invention provides a system and method for secure communication of access information to a telecommunications network and for using network services, such as a personal reach service. In that regard, the present invention communicates the access information to the network over a paging channel, which provides improved security.

In accordance with the present invention, when a call for the user is received at a personal reach service node, a paging message is transmitted to the user through a paging system, the paging message indicating that the call has been received. The user then places a call to the personal reach service node. Upon receiving the call from the user, a request for access information is transmitted to the user. The user then transmits a paging signal from a two-way pager, the paging signal including an indicator of the access information. The personal reach service node receives the indicator of the access information from the user through the paging system and validates the indicated access information. If the indicated access information is valid access is granted to the personal reach service and the two calls are connected to each other.

BRIEF DESCRIPTION OF THE DRAWINGS

FIG. 2 is a flow diagram of a secure access information transmission process, implemented in the system of FIG. 1a.

DETAILED DESCRIPTION OF THE INVENTION

Figure 1A:
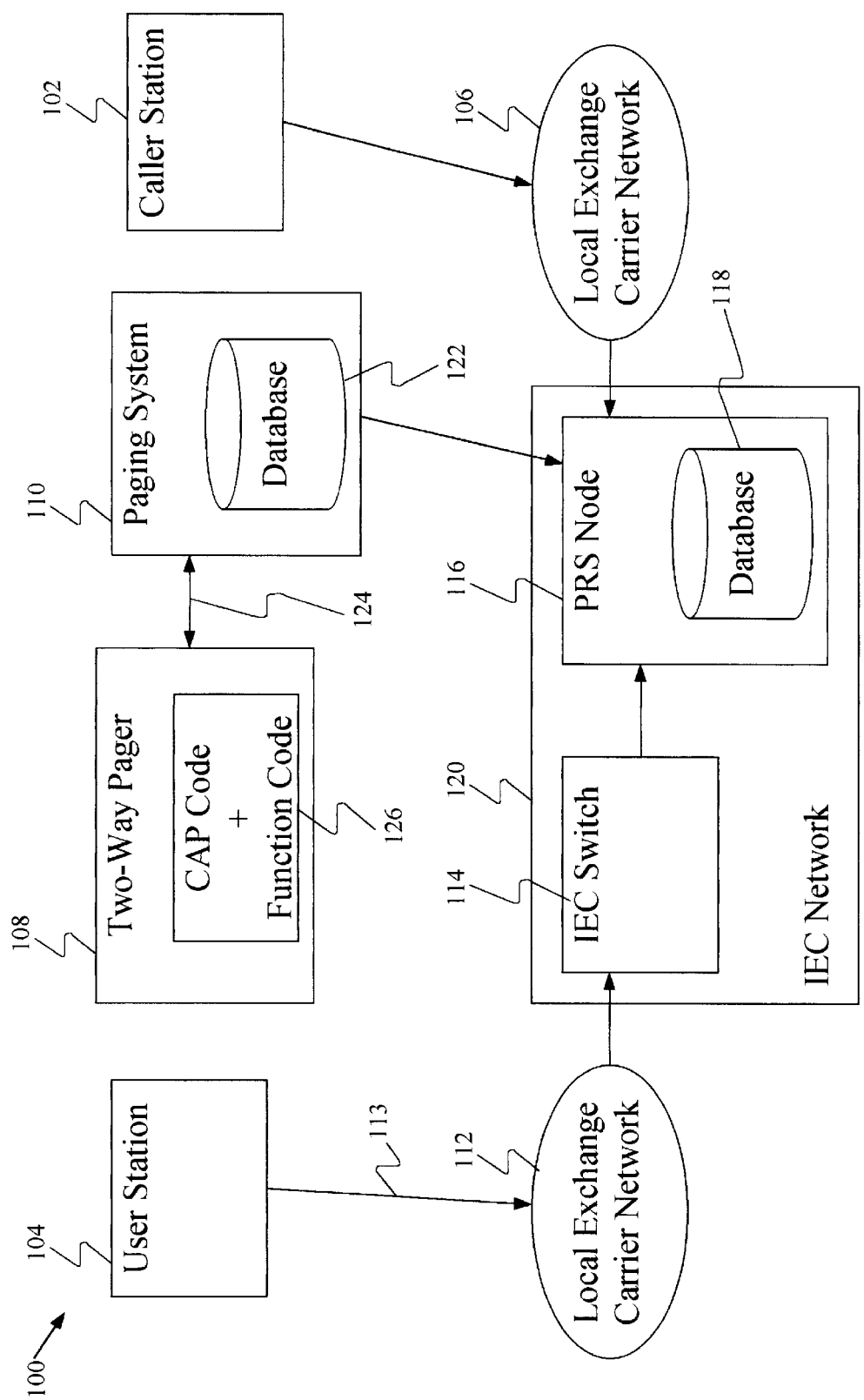
FIG. 1a is a block diagram of a secure access information transmission system according to the present invention.

An exemplary telecommunications network is shown in FIG. 1a. Although a telecommunications network implementing only a personal reach service is shown, the present invention is equally applicable to telecommunications networks implementing other and/or additional services.

Caller station 102 is connected to a local exchange carrier (LEC) network 106. Caller station 102 may be a landline telephone or a mobile telephone, such as a cellular or other wireless telephone. Likewise, user station 104, operated by a user of a personal reach service (PRS), is connected to a LEC network 112 by a first communication channel 113, such as that provided by a landline telephone or a mobile telephone. LEC 106 and LEC 112 may be the same network or they may be different networks. When a call is received at a LEC, a routing database (not shown) is accessed with the dialed number to obtain the routing information needed to complete the call. LEC 106 and LEC 112 are connected to inter-exchange carrier (IEC) network 120. IEC network 120 includes a switch 114, which routes and completes calls to and from IEC network 120, and a personal reach service (PRS) node 116, which provides PRS services. PRS Node 116 includes database system 118, which stores and accesses the data used by PRS node 116 in providing PRS services, such as the secure access information transmission of the present invention.

The user also has and operates a two-way pager 108, which provides a second communication channel 124. Pager 108 is in two-way communication with paging system 110. Paging system 110 is connected to PRS node 116, for communicating data needed for carrying out secure access information transmission. Included in paging system 110 is database system 122, which stores and accesses data needed for providing paging services. Although not shown, paging system 110 is typically connected to a plurality of PRS nodes, when there are a plurality of PRS providers available.

Pager 108 is capable of transmitting signals, such as the signal indicated by 126, which are selected by the user. Typically, the user selects which signal is transmitted by pressing one or more buttons on pager 108. Signal 126 includes a CAP code which identifies the pager and is unique from pager to pager within a particular paging system network. Thus, a CAP code can be used to uniquely identify the user who has the pager. Signal 126 also includes a function code indicating which function is to be performed upon receipt of the signal.

Figure 1B:
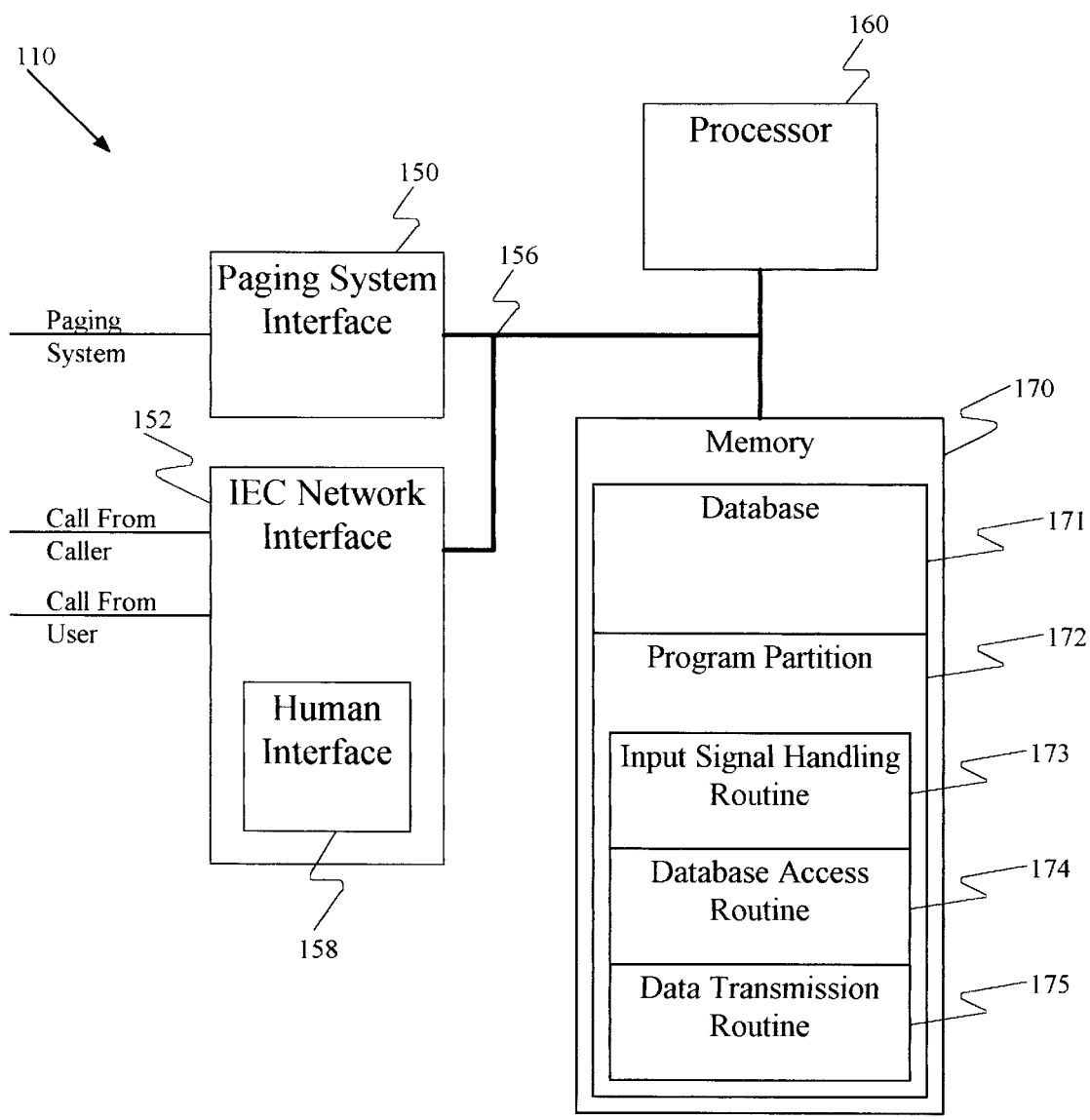
FIG. 1b is a block diagram of a personal reach service node of FIG. 1a, according to the present invention.

PRS node 116 is shown in more detail in FIG. 1b. PRS node 116 includes a processor 160, a memory 170, a paging system interface 150 and an IEC network interface 152, all connected by bus 156.

Paging system interface 150, which is coupled to paging system 110 of FIG. 1a, communicates data, such as paging messages to be transmitted or paging messages which have been received, between the paging system and PRS node 110. The paging messages or other data is communicated between paging system interface 150 and processor 160 over bus 156.

IEC network interface 152, which is coupled to IEC network switch 114 of FIG. 1a, receives telephone calls from IEC switch 114, under the control of processor 160. IEC network interface 152 includes human interface 158, which transmits voice or tone prompts to callers and receives voice or tone inputs from callers, all in a well-known manner. The commands which control human interface 158, as well as the inputs received from callers are communicated to processor 160 over bus 156. IEC network interface is also has call handling capabilities, such as placing a call on hold or bridging together two or more received calls.

Processor 160 controls the operation of the other elements of PRS node 110. Preferably, processor 160 is a programmed general-purpose computer, but it may also be implemented in a dedicated computer, a micro-controller, discrete or integrated logic, etc., as is well-known in the art. Processor 160 communicates with memory 170 over bus 156. Memory 170 is accessible by processor 160 and stores program instructions and data necessary for the operation of processor 160.

Memory 170 may be one or more of a number of well-known devices, such as random access memory, read-only memory, erasable read-only memory, hard disk drives, floppy disk drives, tape drives, optical drives, etc. Memory 170 includes program partition 172, which includes several routines. Input signal handling routine 173 implements the processing of input signals from users and from paging systems. Database access routine 174 implements the accessing of database 171 and the retrieval of information therefrom. Data transmission routine 175 implements the transmission of data in and out of outdial node 108. Database 171 stores and accesses the data used by PRS node 110.

Figure 2:
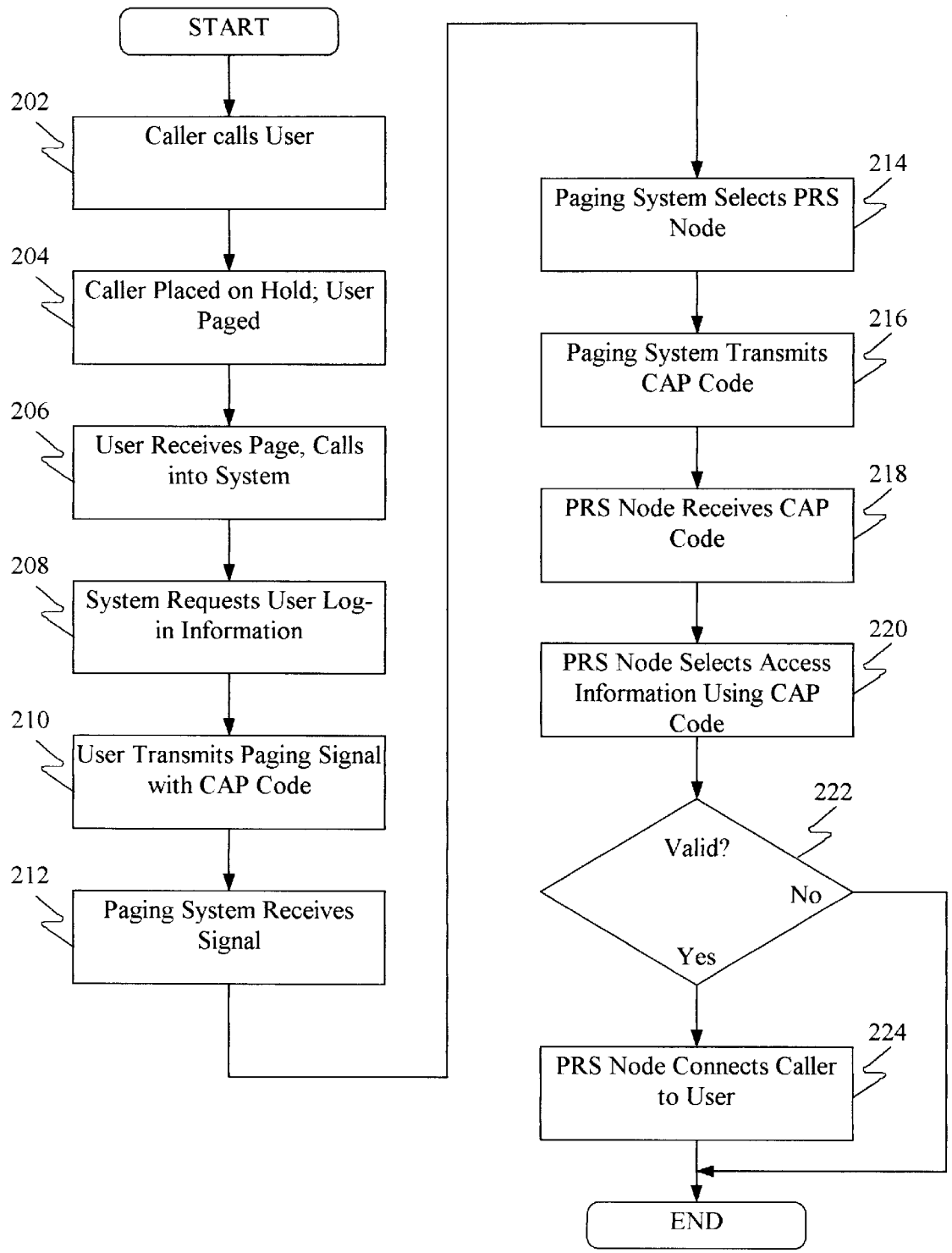

Referring to FIG. 2, which is best viewed in conjunction with FIG. 1a, a flow diagram of a secure access information transmission process according to the present invention is shown. At step 202, a caller places a call from caller station 102 to a user at user station 104 using the user's PRS access number. The access number is typically a special service telephone number, such as an "800" number. This call is received by local exchange carrier (LEC) network 106. LEC 106 recognizes the call as a special service call, typically from the area code. A standard telephone number is geographically based and provides sufficient information for the call to be routed. However, a special service telephone, such as "800", is not geographically based. LEC 106 must access a routing database using the dialed number and obtain the necessary routing information. In the present invention, LEC 106 routes the call to the PRS access number to IEC 120, which routes the call to the PRS node 116 belonging to the user's PRS provider.

At step 204, PRS node 116 recognizes user 104 as the called party based on the access number dialed by the caller, places caller 102 on hold and pages the user. In order to initiate the page, PRS node 116 transmits data identifying pager 108 to paging system 110 along with message data instructing the user to call into the PRS system. Paging system 110 then transmits the page to pager 108 in a well-known manner. At step 206, pager 108 receives the page and displays it to the user. The user then calls into IEC network 120 using the same user access number. This call is handled by LEC 112 and is also routed to PRS node 116.

At step 208, PRS node 116 requests access information, such as login information, for example, from the user. Typically, this is done by a voice prompt transmitted over the call channel. In a conventional system, the user enters the login information by transmitting dual-tone, multiple frequency (DTMF) tones, also known as touch-tones, using the keypad of the telephone. If the user is using a mobile phone, such as a cellular phone, this approach poses a security risk, since the mobile phone signal may be intercepted and the login information captured and misappropriated by unauthorized parties. In the present invention, the user enters the login information at step 210, by transmitting a paging signal from two-way pager 108, typically by pressing one or more buttons on pager 108. The signal includes a code, known as a "CAP code", identifying pager 108, and a function code indicating that the "PRS login" function is to be performed. The pager does not actually transmit the PRS login information.

At step 212, paging system 110 receives the signal transmitted by pager 108, recognizes the function code and proceeds to step 214. At step 214, paging system 110 accesses database 122 using the received CAP code as a key, and obtains information identifying the PRS node providing service to the user identified by the received CAP code and the access information needed to allow the user to access the service. At step 216, paging system 110 transmits the CAP code and access information to the identified PRS node.

At step 218, PRS node 116 receives the information from paging system 110. At step 220, PRS node 116 accesses database 118 using the CAP code as a key, and obtains the access information for the user. At step 222, PRS node 116 validates the received access information. In a preferred embodiment, the access information is simply a user identification code (ID). PRS node uses the received user ID to attempt to match a waiting caller with a waiting user. If there is a waiting call to the user with the received user ID and there is also a waiting call from the user with the received user ID, then the process performs step 224, in which access is granted by the PRS node bridging the two calls, thus connecting the user with the caller. If there is no match between the user and a waiting caller, as might happen if the "PRS login" signal were inadvertently transmitted from the pager, the information received from the paging system is simply discarded.

Figure 3A:
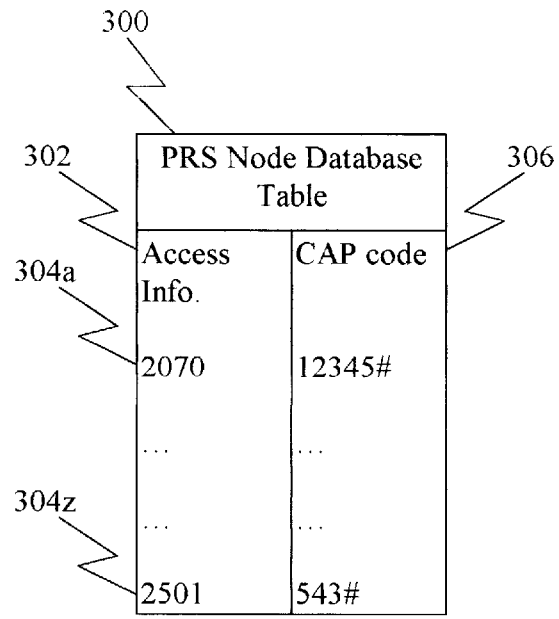
FIG. 3a is an exemplary format of a PRS node database table stored in a PRS node database system according to the present invention.

FIG. 3a shows the format of the PRS node database table 300, which is contained by PRS node database system 118. Table 300 includes a plurality of date entries 304a–z. Each data entry includes two fields, that is, a CAP code field 306 and access information field 302. PRS node 116 accesses table 300 using the received CAP code as a key, and compares the received CAP code to the contents of the CAP code field 306 for each entry 304a–z. Upon finding a match between the received CAP code and the contents of an entry CAP code field, the contents of the access information field 302 corresponding to the matched entry is output.

Figure 3B:
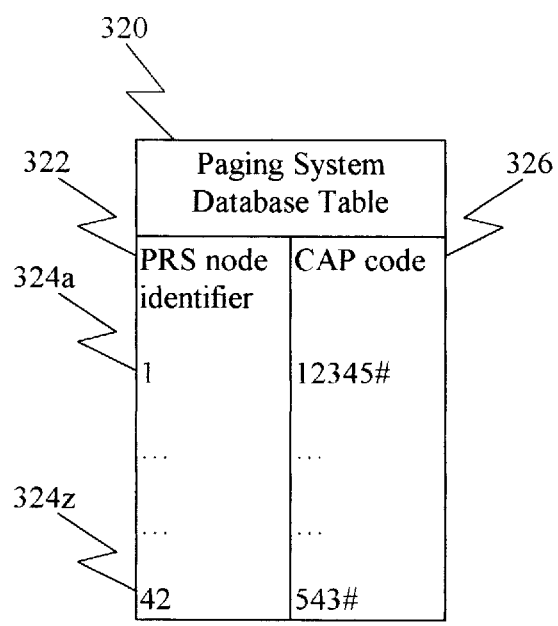
FIG. 3b is an exemplary format of a paging system database table stored in a paging system database system according to the present invention.

FIG. 3b shows the format of the paging system database table 320, which is contained by paging system database system 122. Table 320 includes a plurality of data entries 324a–z. Each data entry includes two fields, that is, a PRS node identifier field 322 and a CAP code field 326. Paging system 110 accesses table 320 using the received CAP code as a key, and compares the received CAP code to the contents of the CAP code field 326 of each entry 324a–z. Upon finding a match between the received CAP code and the contents of an entry CAP code field, the contents of the PRS node field 322 corresponding to the matched entry is output.

Although a specific embodiment has been described, other embodiments are possible. For example, security can be further enhanced by requiring a user to both enter an access information identifier code into the PRS system and to transmit the pager signal. This approach provides a second level of security for accessing the PRS system. As another example, the location of the PRS node may be changed. In one alternative of this embodiment, the PRS node is part of the paging system. Accordingly, paging system database 122 is not required and PRS database 118 is also made part of the paging system. In another alternative of this embodiment, the paging system, the PRS node and the IEC switch are all part of the IEC network. Accordingly, paging system database 122 is again not required. Paging system database 122 is required when the paging system must select a PRS node from among a plurality of PRS nodes.

What is claimed is:

1. A method of secure communication of access information at a personal reach service node coupled to a paging system, comprising the steps of:

receiving a first call from a user;

transmitting a request for access information to the user;

receiving an indicator of the access information from the user through the paging system;

validating the indicated access information; and granting access to the personal reach service, if the indicated access information is valid.

2. The method of claim 1, further comprising the steps of:

receiving a second call, for the user, at the personal reach service node; and transmitting a paging message to the user through the paging system, the paging message indicating that the second call has been received at the personal reach service node.

3. The method of claim 2, wherein the step of granting access to the personal reach service comprises the step of connecting the first call to the second call.

4. The method of claim 3, wherein the personal reach service node includes a database having a plurality of entries, each entry comprising an indicator of a user and access information, the received indicator of the access information includes an indicator of the user and the validating step comprises the steps of:

accessing the database; and validating the access information in the database entry corresponding to the user indicated by the received indicator of the user.

5. The method of claim 3, wherein the step of receiving an indicator of the access information comprises the steps of:

receiving a paging signal including an indicator of the access information at the paging system;

transmitting the received indicator of the access information from the paging system to the personal reach service node; and receiving the indicator of the access information at the personal reach service node.

6. The method of claim 3, wherein the paging system is coupled to a plurality of personal reach service nodes and the step of receiving an indicator of the access information comprises the steps of:

receiving a paging signal including an indicator of the access information at the paging system;

selecting a personal reach service node based on the received paging signal, transmitting the received indicator of the access information from the paging system to the selected personal reach service node; and receiving the indicator of the access information at the personal reach service node.

7. The method of claim 6, wherein the paging system includes a first database having a plurality of entries, each entry comprising an indicator of a user and an indicator of a personal reach service node, the received indicator of the access information includes an indicator of the user and the selecting step comprises the steps of:

accessing the first database;

selecting the personal reach service node indicated in the entry in the first database corresponding to the user indicated by the received indicator of the user.

8. The method of claim 7, wherein the personal reach service node includes a second database having a plurality of entries, each entry comprising an indicator of a user and access information and the validating step comprises the steps of:

accessing the second database; and validating the access information in the entry in the second database corresponding to the user indicated by the received indicator of the user.

9. A method of secure communication of access information at a personal reach service node including a paging system, comprising the steps of:

receiving a first call from a user;

transmitting a request for access information to the user;

receiving an indicator of the access information from the user through the paging system;

validating the indicated access information; and granting access to the personal reach service to the user, if the indicated access information is valid.

10. The method of claim 9, further comprising the steps of:

receiving a second call, for the user, at the personal reach service node; and transmitting a paging signal to the user indicating that the second call has been received at the personal reach service node.

11. The method of claim 10, wherein the step of granting access to the personal reach service comprises the step of connecting the first call to the second call.

12. The method of claim 11, wherein the personal reach service node includes a database having a plurality of entries, each entry comprising an indicator of a user and access information, the received indicator of the access information includes an indicator of the user and the validating step comprises the steps of:

accessing the database; and validating the access information in the database entry corresponding to the user indicated by the received indicator of the user.

13. A personal reach service node coupled to a paging system, comprising:

a first receiver receiving a first call from a user;

a first transmitter transmitting a request for access information to the user;

a second receiver receiving an indicator of the access information from the user through the paging system;

a validation device validating the indicated access information; and an access device granting access to the personal reach service, if the indicated access information is valid.

14. The system of claim 13, further comprising:

a third receiver receiving a second call, for the user; and a second transmitter transmitting an indication to the user, through the paging system, that the second call has been received at the personal reach service node.

15. The system of claim 14, wherein the access device further connects the first call to the second call.

16. The system of claim 15, wherein the received indicator of the access information includes an indicator of a user and the validation device comprises:
   a database comprising a plurality of entries, each entry comprising an indicator of a user and access information; and
   a validation unit validating the access information in the entry corresponding to the user indicated by the received indicator of the user.

17. A paging system for transmitting access information from a user to a personal reach service node, comprising:
   a first receiver receiving a paging signal including an indicator of the access information; and
   a first transmitter transmitting the received indicator to the personal reach service node.

18. The system of claim 17 further comprising:
   a second receiver receiving a message for the user indicating that a call for the user has been received at the personal reach service node; and
   a second transmitter transmitting a paging signal including the received message.

19. The system of claim 17, wherein the paging system is coupled to a plurality of personal reach service nodes, further comprising:
   a selection device selecting a personal reach service node based on the received paging signal; and
   wherein the first transmitter transmits the received indicator from the paging system to the selected personal reach service node.

20. The method of claim 19, wherein the received indicator of the access information includes an indicator of the user and the selection device comprises:
   a first database comprising a plurality of entries, each entry comprising indicator of a user and an indicator of a personal reach service node;
   a selector selecting the personal reach service node indicated in the entry corresponding to the user indicated by the received indicator of the user.

21. A personal reach service node with secure communication of access information comprising:
   a first receiver receiving a first call from a user;
   a first transmitter transmitting a request for access information to the user;
   a second receiver receiving a paging signal including an indicator of the access information from the user;
   a validation device validating the indicated access information; and
   an access device granting access to the personal reach service, if the indicated access information is valid.

22. The system of claim 21, further comprising:
   a third receiver receiving a second call, for the user; and
   a second transmitter transmitting a paging signal including a message for the user indicating that a call for the user has been received at the personal reach service node.

23. The system of claim 22, wherein the access device further connects the first call to the second call.

24. The system of claim 23, wherein the received indicator of the access information comprises an indicator of a user and the validation device comprises:
   a database comprising a plurality of entries, each entry comprising an indicator of a user and access information; and
   a validation unit validating the access information in the entry corresponding to the user indicated by the received indicator of the user.

* * * * *